(12) United States Patent
Daoud

(10) Patent No.: US 6,298,191 B1
(45) Date of Patent: Oct. 2, 2001

(54) SPLICE MOUNT HAVING IMPROVED STRUCTURAL INTEGRITY AND METHOD OF MAKING

(75) Inventor: Bassel Hage Daoud, Parsippany, NJ (US)

(73) Assignee: Lucent Technologies, INc., Murray Hill, NJ (US)

( * ) Notice: Subject to any disclaimer, the term of this patent is extended or adjusted under 35 U.S.C. 154(b) by 0 days.

(21) Appl. No.: 09/364,813

(22) Filed: Jul. 30, 1999

(51) Int. Cl.[7] ........................................ G02B 6/00
(52) U.S. Cl. ........................................ 385/137; 264/1.25
(58) Field of Search .................... 385/134–137; 264/1.25

(56) References Cited

U.S. PATENT DOCUMENTS 5,185,845 * 2/1993 Jones ..................................... 385/135
5,530,786 * 6/1996 Radliff et al. ........................ 385/136

* cited by examiner

Primary Examiner—Rodney Bovernick
Assistant Examiner—Sarah N Song
(74) Attorney, Agent, or Firm—Howard C. Miskin; Gloria Tsui-Yip

(57) ABSTRACT

A splice mount and method of making a splice mount having improved structural integrity for telecommunications applications. The splice mount is formed by a two-directional molding process so that resilient holding pockets are separated into groups and remain interconnected to each other by a continuous strip. The continuous strip increases the structural integrity of the splice mount relative to prior art splice mounts.

5 Claims, 8 Drawing Sheets

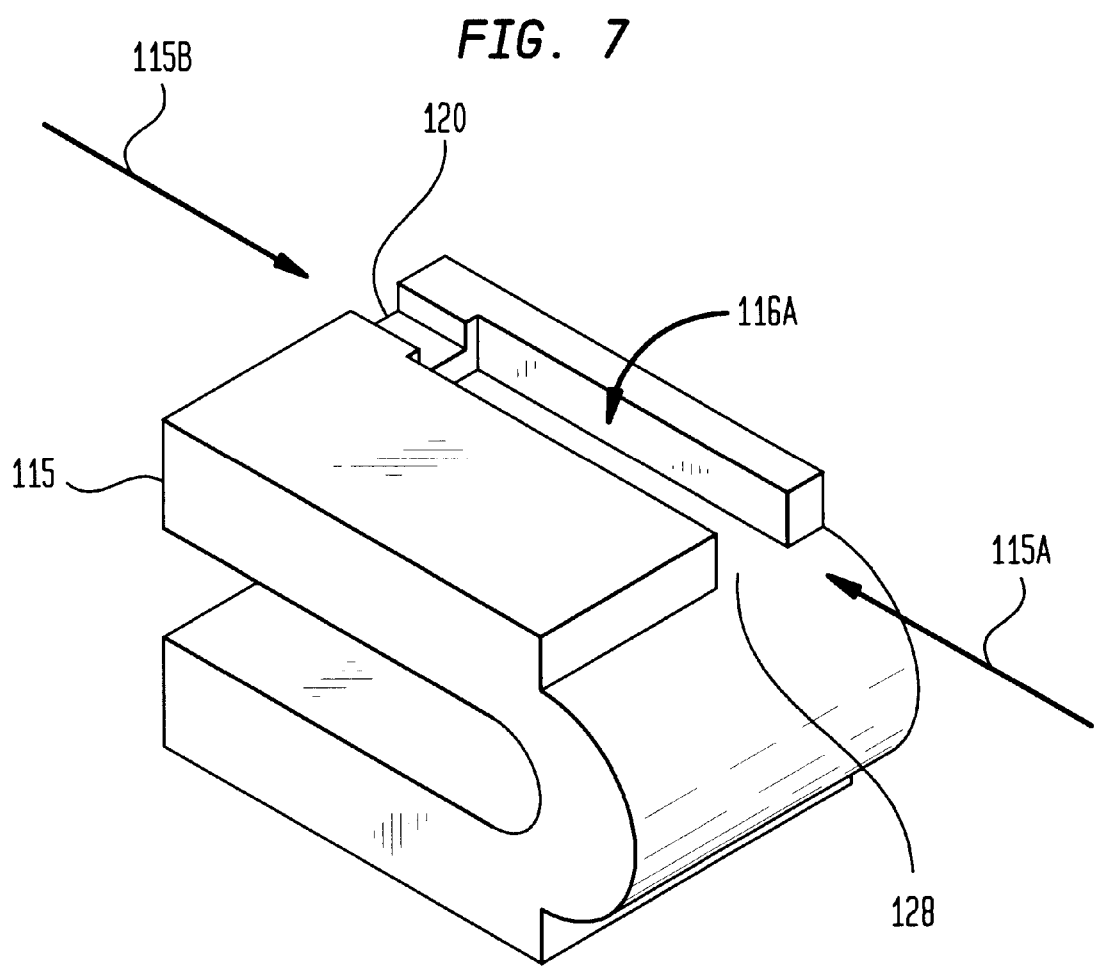

SPLICE MOUNT HAVING IMPROVED STRUCTURAL INTEGRITY AND METHOD OF MAKING

FIELD OF THE INVENTION

This invention relates to a telecommunication apparatus and, in particular, to a splice mount having improved structural integrity and a method of forming thereof.

BACKGROUND OF THE INVENTION

Fiber optic telecommunications establish communication, usually between widely separate points, and commonly involve splicing operations which provide joints between two fiber optic cables. The splices are used, in part, to interconnect subscribers to a telecommunication provider, such as a telephone service provider. Typically, the splices may be accomplished in a basement of a subscriber and mounted on a splice mount which, in turn, is mounted on a splice tray to form a splice holder and which, in turn, along with multiple occupied splice holders, are mounted in a distribution panel. Splice trays find multiple applications and the ease of their use and their placement within a distribution panel greatly assist the technician who installs and maintains telecommunication apparatus.

Telecommunications splice holders are known and one such holder may be further described with reference to FIG. 1 showing a top view of a splice mount 10 that is placed into and attached to a tray (not shown) which is an open receptacle with a flat bottom and low rim for holding the splice mount and forming the overall splice holder.

The splice mount 10 is commonly comprised of a foam or resilient material used to provide for a plurality of resilient members formed into at least two groups 12 and 14 respectively comprising 12A, 12B, 12C, 12D, 12E, 12F, 12G and 12I and 14A, 14B, 14C, 14D, 14E, 14F, 14G and 14I. Each of the resilient members of the groups 12 and 14 is segmented into shared and adjacent pairs separated from each other by a predetermined spacing which forms a slot between adjacent resilient members 12A . . . 14I. Each pair of resilient holders is arranged as shown in FIG. 1 to form resilient holding pockets therebetween. More particularly, the resilient members 12A, . . . 12I are arranged to provide for holding pockets 16A, 16B, 16C, 16D, 16E, 16F, and 16G, whereas the resilient members 14A . . . 14I are arranged to provide for resilient holding pockets 18A, 18B, 18C, 18D, 18E, 18F, and 18G.

Each of the resilient holding pockets 16A . . . 16G and 18A . . . 18G has a passageway 20 that is provided between each pair of associated resilient members, with the passageway 20 being of a space which is less than the space between resilient members 12A . . . 14I that cooperatively form the resilient holding pockets 16A . . . 16G, 18A . . . 18G. The resilient members 12A, 12B, 12C, 12D, 12E, 12F, 12G and 12I are respectively separated from resilient members 14A, 14B, 14C, 14D, 14E, 14F, 14G, and 14I by ribs 22A, 22B, 22C, 22D, 22E, 22F, 22G and 22I which also lay under and are interconnected to resilient members 12A . . . 14I.

In operation, the splice mount 10 accommodates both single fusion and mass fusion splices, both known in the art. For a generally narrower and longer single fusion splice, the spliced member spans the distance 24 of the splice mount 10 as shown in FIG. 1 and is held in place in the splice mount 10 by friction created by pressing the spliced member into its associated passageway 20. Similarly, for a generally wider and shorter mass fusion splice, the spliced member spans the distance 26 of the splice mount 10 as shown in FIG. 1 and is held in placed in the splice mount 10 by friction created by pressing the spliced member into its associated resilient holders, such as 16A–18A. Ribs 22A . . . 22I forming cutouts separating the two groups of associated resilient members 12A . . . 14I allow access for pulling the spliced member out with either a finger or a tool. Further details of the splice mount 10 may be further described with reference to FIG. 2 comprised of FIGS. 2 (A), 2 (B) and 2 (C), wherein FIG. 2 (B) is a side view taken along line 2B—2B of FIG. 2A, and FIG. 2C is a front view taken along line 2C—2C of FIG. 2 (A).

FIG. 2 (A) illustrates that the ribs, such as rib 22E, run under and provide support for their associated resilient holders. FIG. 2 (A) also shows that the resilient holding pockets, such as 16A and 18A, are interconnected by a continuous opening formed by a slot, such as slot 28A.

FIG. 2 (B) illustrates that each of the resilient members, such as members 12I and 14I, has a contoured shape and possesses a thickness. FIG. 2 (C) illustrates the same thickness as that of FIG. 2 (B) and further illustrates that the resilient members 12A . . . 12I have a contoured shape and between adjacent resilient members, such as 12A and 12B, is a passageway 20 and an associated resilient holding pocket, such as 16A. FIG. 2 (C) also shows that each adjacent pair of resilient members 12A . . . 14I forms passageway 20 and resilient holding pockets 16A . . . 18G with constricted necks towards the surface for increased frictional hold of the spliced members.

From FIGS. 1 and 2, in particular, FIG. 1, it is seen that the resilient holding pockets, such as 16A and 18A, are interconnected by the continuous slot 28A, formed by undercuts placed in the foam splice mount during its molding, which burdens the prior art splice mount 10 with structural disadvantages. The process used to form the prior art splice mount 10 may be further described with reference to FIGS. 3 and 4.

FIG. 3 illustrates a piece of foam material 15 used during a prior art process, commonly referred to as a four-directional process, to form the splice mount 10 and in which up and down motions, indicative by directional arrows 15A and 15B, are used to form the resilient pockets, such as 16A and 18A. It should be noted that the resilient pockets formed by the up and down motions pass all the way through the material 15 to form slots, such as 28A, which contributes to the flimsy structure of the splice mount 10 which may be described with reference to FIG. 4.

FIG. 4 illustrates the up and down molding process of material 15 of FIG. 3 by a top mold shaping member 15C and by a bottom mold shaping member 15D which operatively cooperates with each other, in an up-down manner, to form the constricted neck between adjacent resilient members 12A . . . 14I. Again, it should be noted that the resilient holding pockets 16A . . . 18G pass all the way through the material 15 which contribute to the flimsy structure of the splice mount 10. It should be noted that the respective resilient holding pockets 16A . . . 18G are interconnected by the respective slots such as 28A.

FIG. 5 illustrates the same piece of material 15 of FIGS. 3 and 4 being further shaped by a side mold shaping member 15E for the side to side motion of the prior art four-directional molding process. FIG. 5 shows only one of the two side motion to form passageway 20 adjacent to resilient holding pocket 16A, it being understood that the associated passageway 20 adjacent to resilient holding pocket 18A is formed in an identical manner in the opposite direction. Side molding shaping member 15E is shaped with a constricted neck to form the passageway 20.

The splice mount 10 being comprised of a foam material and having the slot opening, such as 28A, cause the splice mount 10 to be of a flimsy structure and unable to stand by itself to form a splice tray but rather needs to be placed into a splice tray. This flimsy structure is a disadvantage especially when the splice mount 10 needs to be manually manipulated to attach to its associated splice tray for undisturbed and substantially parallel alignment of the resilient members 12A . . . 14I and resilient holding pockets 16A . . . 18G. The flimsy structure of splice mount 10 requires precise manipulation of its position and thereby causes attendant drawbacks of increasing the cost (more time spent to fabricate) of the splice tray carrying the splice mount 10.

It is desired that a splice mount be provided having increased structural integrity so that it may be more easily assembled into an associated tray thereby reducing attendant costs of the splice holder. Further, it is desired that a splice mount be provided that may have a structure so as to serve as a splice holder without the need of a supporting tray.

SUMMARY OF THE INVENTION

The invention of one aspect is a splice mount having improved structural integrity, relative to prior art devices, thereby yielding the attendant benefit of reducing its associated cost when used to form a splice holder.

The invention of another aspect comprises a method of forming a splice mount by a molding apparatus having means for providing shaping so that the splice mount has at least first and second groups of holding pockets that are spaced apart from each other. The method comprises the stepe of providing raw material in first and second sections and operating the molding apparatus so that said first group of holding pockets is shaped into the first section of provided raw material and so that the second group of holding pockets is shaped into the second section of provided raw material, while at the same time maintaining a continuous strip of material between the first and second groups of holding pockets.

The splice mount comprises a plurality of resilient members interconnected by a continuous strip into at least two groups with each group segmented into pairs separated from each other and with each pair of resilient members forming a resilient holding pocket therebetween.

BRIEF DESCRIPTION OF THE DRAWINGS

FIG. 7 generally illustrates the manner in which a two-directional process associated with the present invention is used to form a splice mount of the present invention having improved structural integrity.

It will be appreciated that, for the purposes of illustration, these figures are not necessarily drawn to scale.

DETAILED DESCRIPTION OF THE PREFERRED EMBODIMENTS

Figure 1:
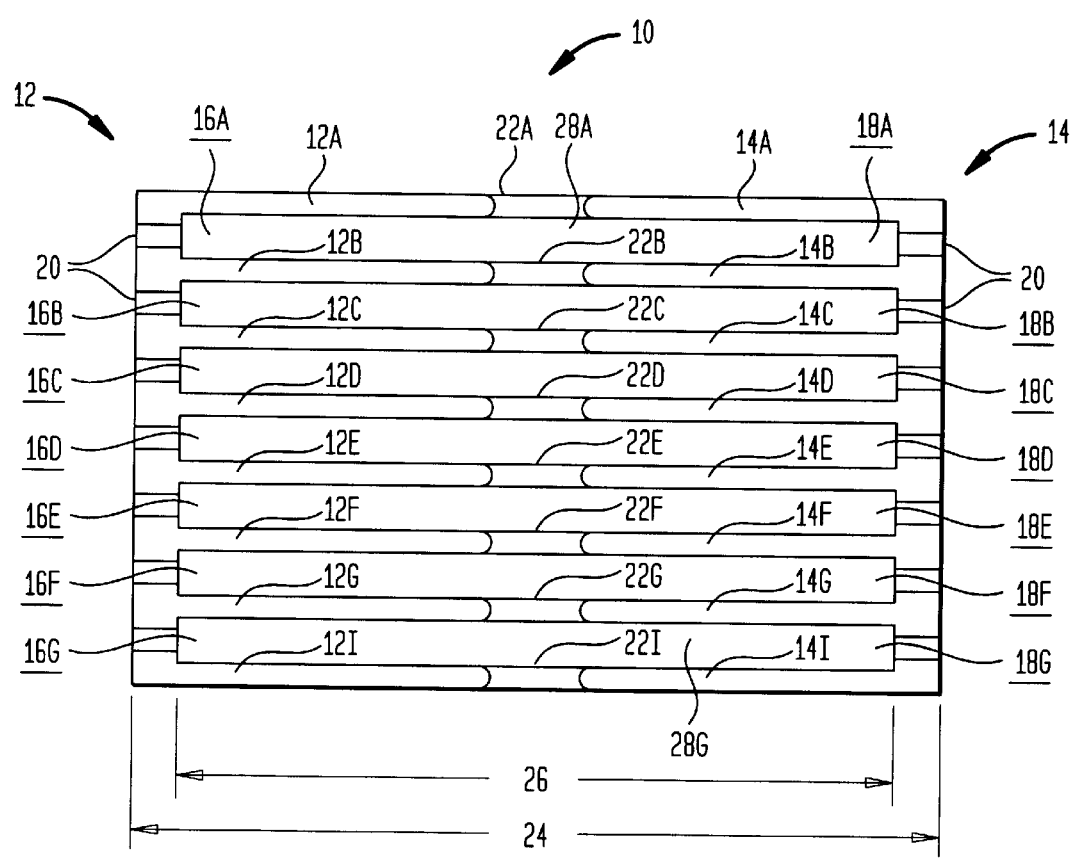
FIG. 1 is a schematic illustrating a prior art splice mount.
Figure 6:
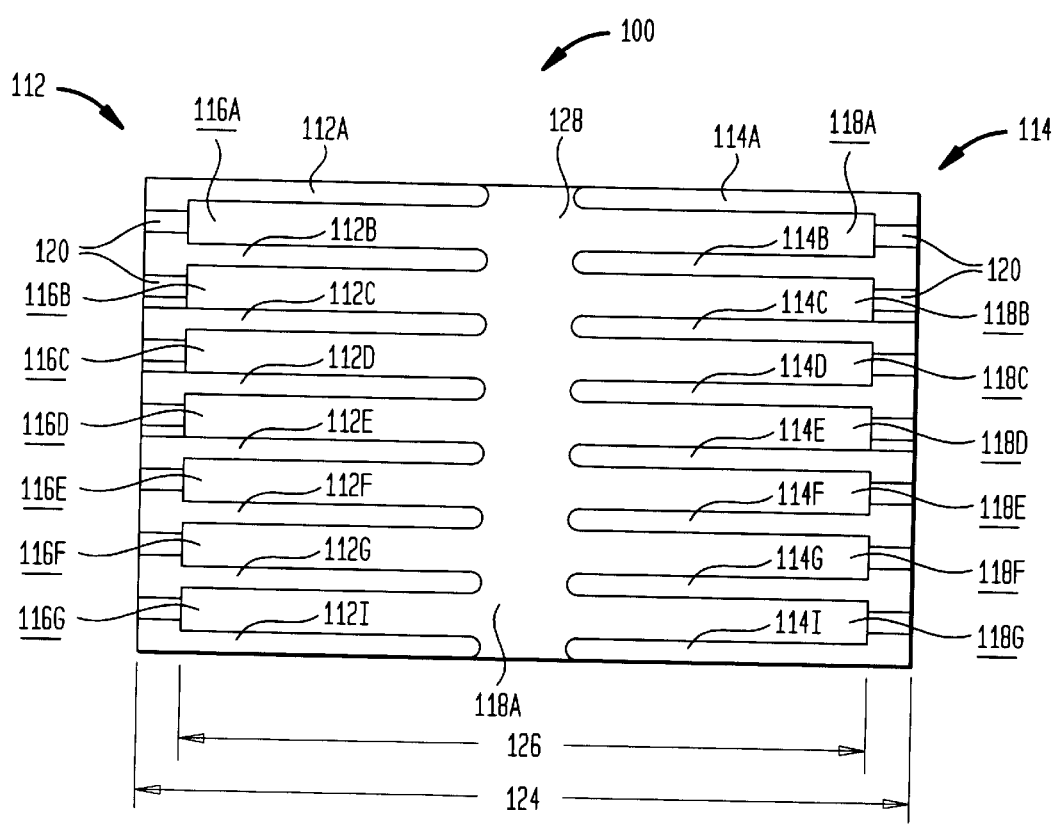
FIG. 6 schematically illustrates the splice mount of the present invention.

FIG. 6 illustrates a splice mount 100 having many of the elements of the splice mount 10 previously described with reference to FIGS. 1 and 2, wherein the same elements of the splice mount 100 are correlated to the same elements of the splice mount 10 by reference numbers that are displaced from each other by a value 100. Unlike splice mount 10 of FIGS. 1 and 2 having a continuous opening slot 28A . . . 28G connecting its interrelated resilient holding pockets 16A . . . 18G, the splice mount 100 of the present invention has its resilient holding pockets 116A . . . 118G that do not pass through the splice mount 100 but rather are interconnected by a continuous strip 128. The continuous strip 128 provides for increased structural integrity, relative to the prior art splice mount 10, which, in turn, allows the splice mount 100 to be more easily manipulated when it is mated to its splice tray, such as the splice tray of FIG. 10 to be further described. Furthermore, due to its improved structural integrity the splice mount 100 may be used with or without a tray. The continuous strip 128 is provided by a two-directional method performed in accordance with the practice of the present invention and which may be further described with reference to FIG. 7.

FIG. 7 generally illustrates a piece of foam material 115 being molded in a folded position by a two-directional process related to the present invention in which the resilient holders 116A . . . 118G, such as 116A, are formed in a first direction, indicated by directional arrow 115A and, also in which the passageways 120 are formed in a second opposite direction indicated by directional arrow 115B. From FIG. 7 it should be noted that the resilient holders 116A . . . 118G do not pass all the way through the material 115, but rather leave the continuous strip 128.

The method of the present invention uses a folded design shape during molding. Initially, raw material 115 is in the form of first and second sections. The molding apparatus is then activated so that the first and second groups of resilient holding pockets 116A . . . 118G are shaped into the first and second sections of raw material from one direction. Their associated passageways 120 are shaped into the first and second sections of the raw material 115 from the opposite direction.

Figure 3:
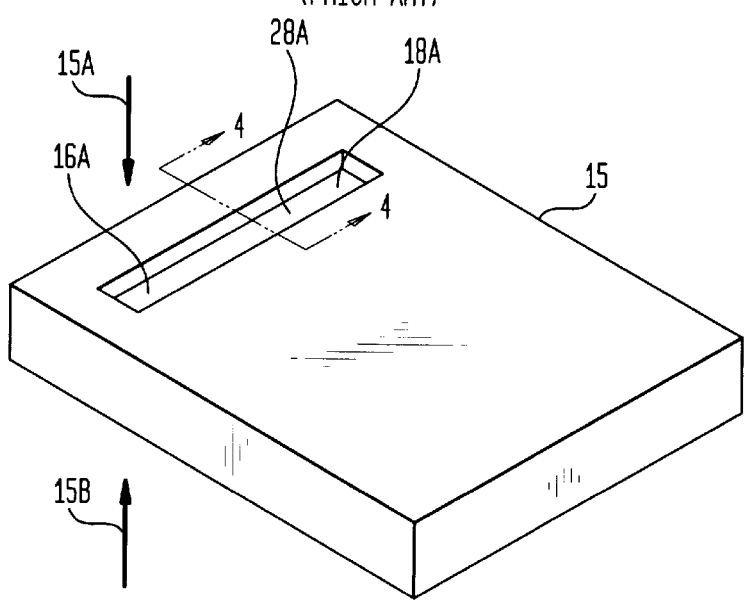
FIG. 3 generally illustrates a step associated with a four-directional prior art process for forming a resilient holder that extends all the way through the material being molded.
Figure 4:
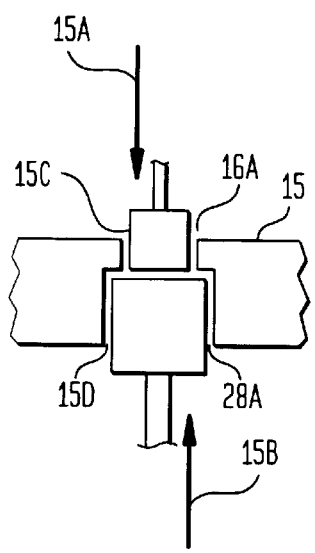
FIG. 4 generally illustrates the step for forming the resilient holder shown in FIG. 3.
Figure 5:
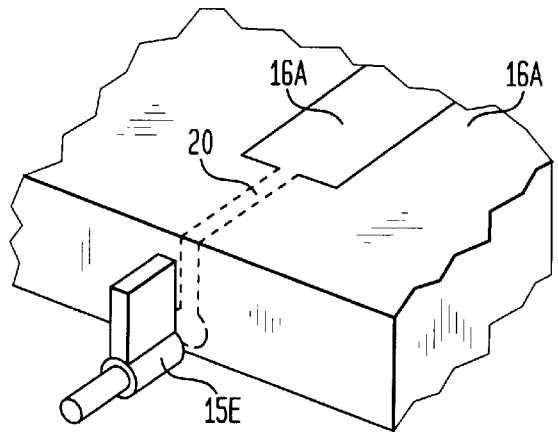
FIG. 5 illustrates another step associated with a four directional prior art process for forming a passageway.

The method of the present invention that forms the splice mount 100 requires a two directional molding method similar to that discussed with reference to FIG. 5 of the prior art process. The method for forming the splice mount 100 requires only the side to side directional molding of FIG. 5 to mold the holding pockets 116A . . . 118G from one side and the passageway 120 from the opposite side, in comparison with the more complicated prior art four directional molding method discussed with references to FIGS. 3, 4 and 5. Essentially, the number of movements involved in forming the mold directly contributes to the cost of the product (splice mount) produced so that reducing (two directional vs. four directional) the movement to produce the splice mount 100 of the present invention reduces the complexity and cost relative to the prior art splice mount 10, as well as increases the speed to produce such a splice mount 100 because of less movements.

Figure 8A:
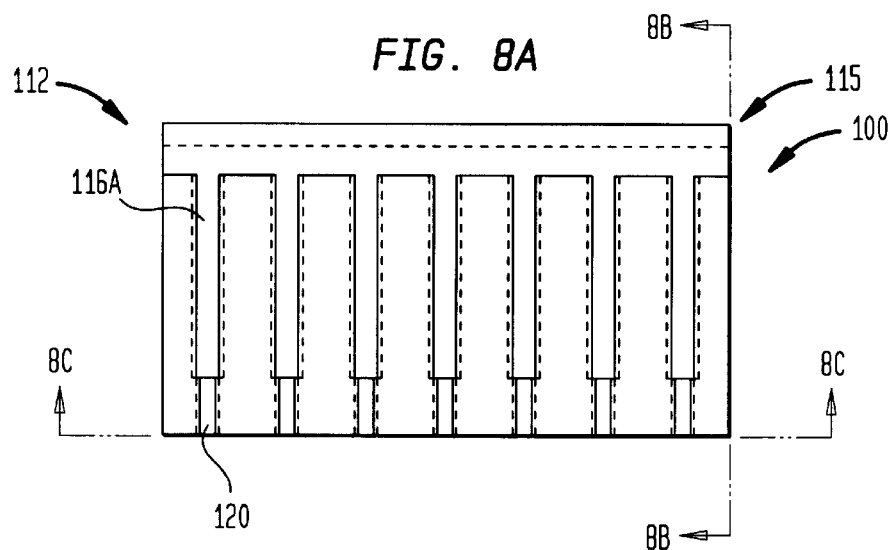
FIG. 8 is composed of FIGS. 8 (A), 8 (B) and 8 (C), which illustrate a folded design molded by the practice of the present invention.

The method of the present invention may be further described with reference to FIG. 8 composed of FIGS. 8 (A), 8(B) and 8(C). The method of the present invention is practiced on a folded material in a molding apparatus (not shown), known in the art, having means for shaping the splice mount 100 to have at least first and second groups 112 and 114 and to provide resilient holding pockets 116A . . . 118G that are spaced apart from each other, as well as to provide passageways 120. As seen in FIG. 8(A) the resilient holding pockets, such as 116A, is included in the first group 112, whereas the holding pockets 118A . . . 118G of the second group 114 are folded behind (not shown) those of the first group 112.

Figure 8B:
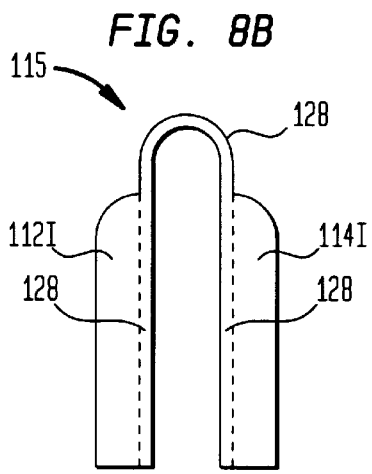
Figure 8C:
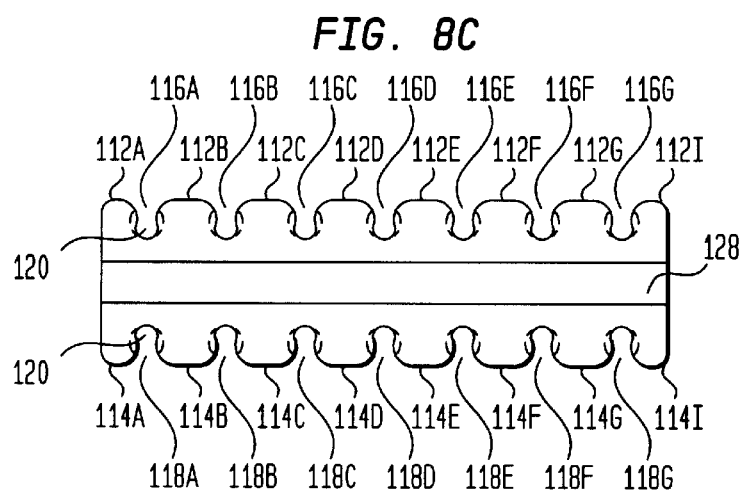

The continuous strip material 128 is shown in FIG. 8 (B) as having a thickness continuous throughout the material 115 which, in turn, contributes to providing improved structural integrity for the splice mount 100.

FIG. 8 (C) further illustrates the folded design shape as it is being molded, wherein the resilient holding pockets 116A . . . 116G are located opposite the resilient holding pockets 118A . . . 118G. Each of the resilient holding pockets 116A . . . 116G is also operatively related to the resilient members 112A . . . 112I and resilient holding pockets 118A . . . 118G are operatively related to resilient members 114A . . . 114I. After the method of the present invention is complete, it provides for an unfolded design shape for its practical applications which may be further described with reference to FIG. 9 which is composed of FIGS. 9 (A), 9 (B) and 9 (C).

Figure 2A:
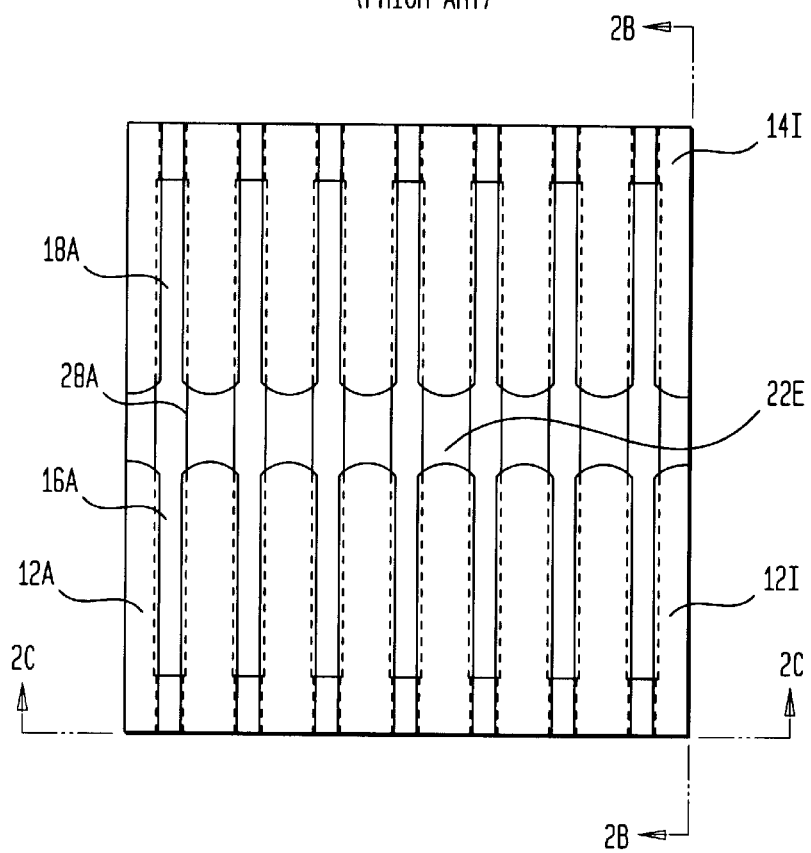
FIG. 2 is composed of FIGS. 2 (A), 2 (B) and 2 (C), all of which illustrate further details of prior art splice mount of FIG. 1.
Figure 2B:
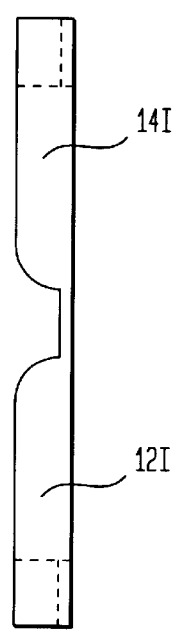
Figure 2C:
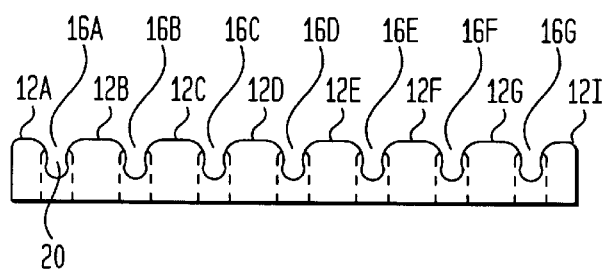
Figure 9A:
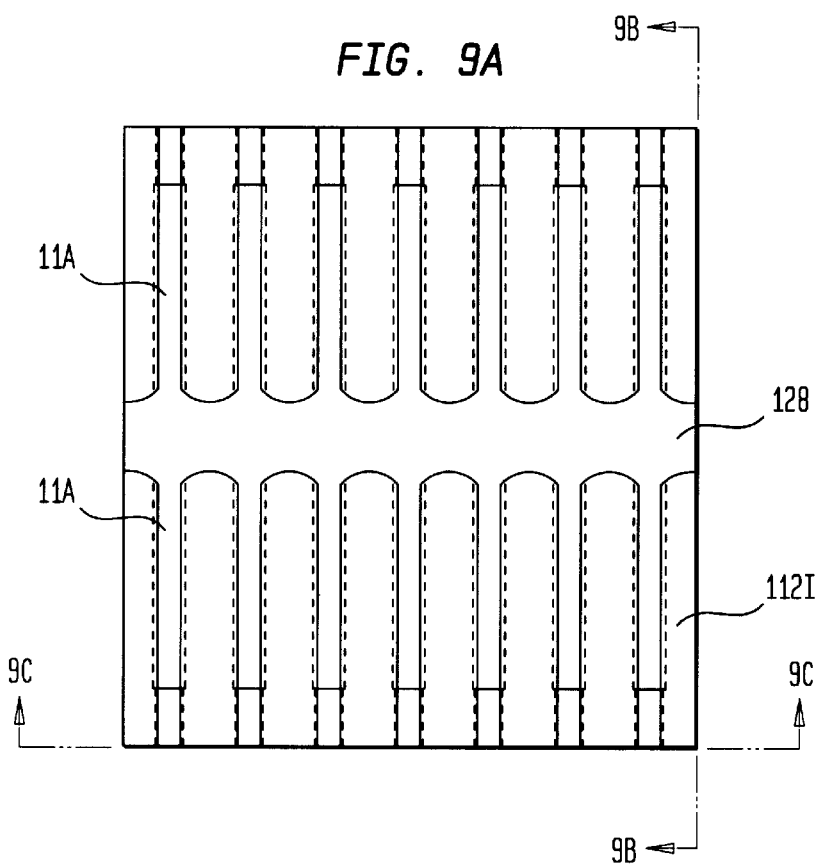
FIG. 9 is composed of FIG. 9 (A), 9 (B) and 9 (C), all of which illustrate further details of the splice mount of FIG. 5.
Figure 9B:
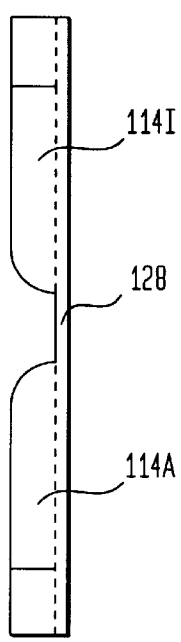
Figure 9C:
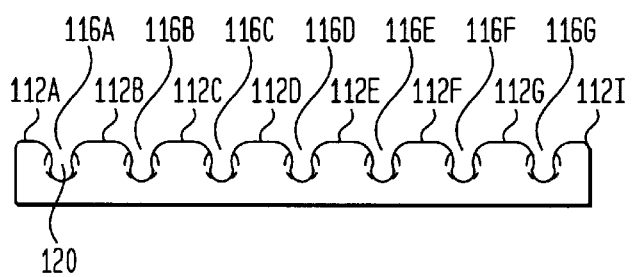

FIGS. 9 (A), 9 (B) and 9 (C), except for the reference numbers being displaced by 100, illustrate essentially the same features of FIGS. 2 (A), 2 (B) and 2 (C), respectively. However, unlike the splice mount 10 of FIG. 2, the splice mount 100 of FIG. 9 of the present invention comprises the uninterrupted strip 128 located under the resilient holding pockets, such as the resilient holding pockets 116A and 118A. This uninterrupted strip 128 improves the structural integrity of the splice mount 100, relative to prior art splice mount 10, which allows it to be more easily handled to provide for the splice trays that are lodged in a distribution panel of a telecommunication provider, as discussed in the "Background" section. Furthermore, due to its structural integrity, the splice mount 100 of the present invention may be used with or without a tray so that the splice mount 100 may by itself serves as a splice holder without an associate splice tray. A typical tray in which the splice mount 100 may be installed is further described with reference to FIG. 10.

Figure 10:
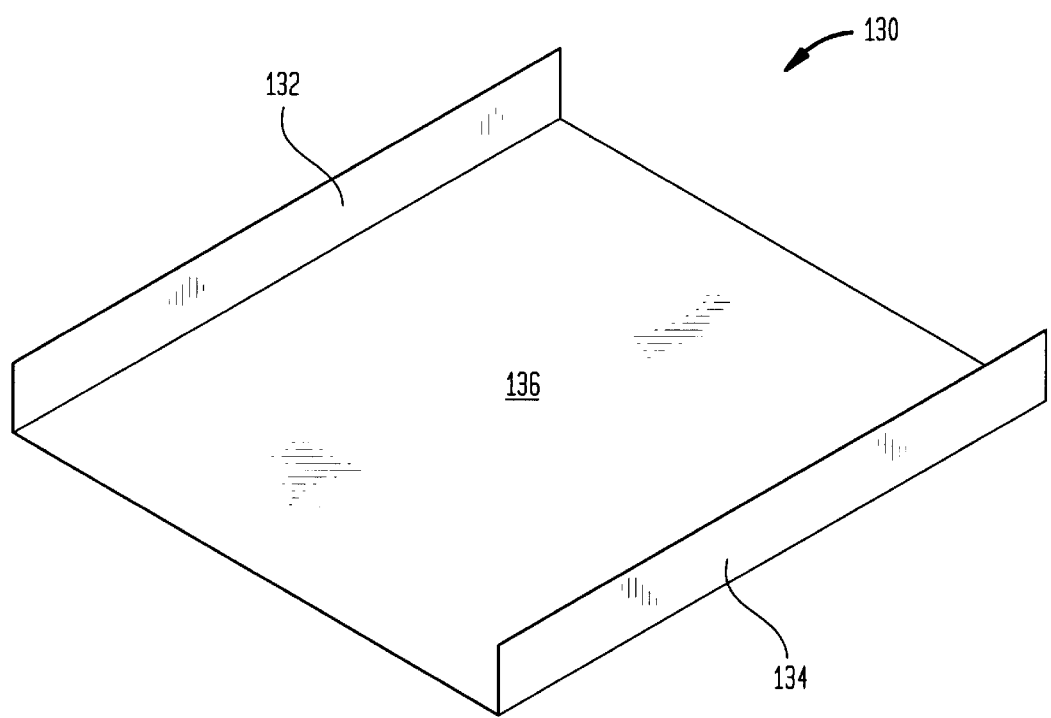
FIG. 10 illustrates a tray for holding a splice mount.

FIG. 10 illustrates a tray 130 having two side walls 132, and 134, and a base 136. Tray 130 provides additional structural support to splice mount 100 to form splice holder. To form the overall splice holder for one embodiment of the present invention, the splice mount 100 of FIGS. 6–9 is manually manipulated by first placing a glue or adhesive on its backside and physically moving the splice mount 100 onto the base 136 so that its adhesive may attach the splice mount 100 to the tray 130, thereby, forming the overall splice holder related to the present invention. In another embodiment of the present invention, the splice mount 100, also serving by itself as a splice holder, may be glued and attached directly to any convenient structure that serves the needs of the technician performing and maintaining the associated splicing operations.

It should now be appreciated that the practice of the present invention provides for a splice mount having improved structural integrity relative to prior art splice mounts.

Various modifications will become apparent to those skilled in the art. All such variations which basically rely on a teaching to which this invention has advanced the art are properly considered within the scope of this invention.

What I claim is:

1. A method of forming a splice mount by a molding apparatus for providing shaping so that said splice mount has at least first and second groups of pre-dimensioned holding pockets that are generally parallel and spaced apart from each other, said method comprises the steps of:

a) providing a resilient raw material in first and second sections and;

b) operating said molding apparatus so that said first and second groups of holding pockets are shaped into said first and second sections of said raw material from one direction while maintaining a continuous strip of material between said first and second groups of holding pockets.

2. The method according to claim 1 wherein said splice mount further having at least first and second groups of pre-dimensioned passageways corresponding to each of said holding pocket, each of said passageway being in alignment and abutting said corresponding holding pocket, further comprising the step of operating said molding apparatus so that said first and second groups of passageways are formed into each of said first and second sections of said raw material from an opposite direction, while maintaining said continuous strip of material.

3. The method according to claim 1, wherein said raw material is made of a foam material.

4. The method according to claim 1, further comprising the step of adhering said splice mount to a tray having dimensions that are complementary to said splice mount so as to allow splice mount to snugly fit into said tray.

5. The method according to claim 4, wherein said tray is made of plastic.

* * * * *